United States Patent
Zheng

(10) Patent No.: US 6,550,735 B1
(45) Date of Patent: Apr. 22, 2003

(54) SUCKER-TYPE SUSPENSION STRUCTURE

(76) Inventor: Zhi-Yuan Zheng, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/058,530

(22) Filed: Jan. 25, 2002

(51) Int. Cl.[7] ............................................. F16B 45/00
(52) U.S. Cl. .................................. 248/304; 248/205.5
(58) Field of Search ............................ 248/304, 205.5, 248/205.6, 205.7, 206.1, 206.2, 341, 301, 294.1, 354.5

(56) References Cited

U.S. PATENT DOCUMENTS

| | | | | |
|---|---|---|---|---|
| 355,021 A | * | 12/1886 | Lang ..................... | 248/205.8 |
| 3,750,991 A | * | 8/1973 | Ragir ..................... | 248/205.8 |
| 4,580,751 A | * | 4/1986 | Panzer .................... | 248/205.8 |
| 5,025,919 A | * | 6/1991 | Brinker et al. .............. | 206/214 |
| 5,029,786 A | * | 7/1991 | Wu ......................... | 248/205.7 |
| 5,423,466 A | * | 6/1995 | Moon ....................... | 224/309 |
| 5,779,205 A | * | 7/1998 | Ching ...................... | 248/205.8 |
| 6,244,778 B1 | * | 6/2001 | Chesbrough ............. | 248/205.6 |
| 6,308,923 B1 | * | 10/2001 | Howard ................... | 248/205.5 |
| 2001/0040202 A1 | * | 11/2001 | Adams, IV ............... | 248/206.2 |
| 2002/0125392 A1 | * | 9/2002 | Zhadanov et al. .......... | 248/313 |

* cited by examiner

*Primary Examiner*—Ramon B. Ramirez
*Assistant Examiner*—Kofi Schulterbrandt

(57) ABSTRACT

A sucker-type suspension structure includes a sucker, a sucker cover, and a suspension hook. The sucker has an outer wall provided with a pull plate which has a distal end formed with a rod passage hole for passage of a pivot rod. The sucker cover is mounted on the outer wall of the sucker, and has a center formed with a plate passage hole for passage of the pull plate of the sucker. The suspension hook has a top formed with a U-shaped plate receiving space for receiving the pull plate of the sucker. The plate receiving space of the suspension hook has two side walls each having a first section formed with a rod passage hole for passage of the pivot rod, and a second section formed with a cover press lug rested on an outer wall of the sucker cover.

7 Claims, 5 Drawing Sheets

SUCKER-TYPE SUSPENSION STRUCTURE

BACKGROUND OF THE INVENTION

1. Field of the Invention

The present invention relates to a sucker-type suspension structure, and more particularly to a sucker-type suspension structure that may be positioned on the wall stably and rigidly.

2. Description of the Related Art

A conventional sucker-type suspension structure in accordance with the prior art comprises a sucker, a sucker cover, a press body, and a gear bushing. The press body is pivotally mounted on the sucker cover and may press the sucker cover, so that the sucker may be secured on an object, such as the wall, so that the conventional sucker-type suspension structure may be secured on the wall for hanging an article. However, the press body is pivotally mounted on the sucker cover, so that the press body cannot be secured on the sucker cover rigidly and stably. Thus, the press body is easily pivoted to detach from the sucker cover, so that the conventional sucker-type suspension structure is easily detached from the wall.

SUMMARY OF THE INVENTION

The present invention has arisen to mitigate and/or obviate the disadvantage of the conventional sucker-type suspension structure.

The primary objective of the present invention is to provide a sucker-type suspension structure, wherein the protective locking pin is in turn extended through the pin passage holes of the suspension hook and the pin passage hole of the pull plate of the sucker, so that the suspension hook may be secured on the pull plate of the sucker, thereby preventing the suspension hook from being detached and pivoted relative to the pull plate of the sucker due to an external force.

Another objective of the present invention is to provide a sucker-type suspension structure, wherein the cover press lugs of the suspension hook are rested on the back face of the sucker cover, and the resting face of the suspension hook is rested on the wall, so that the sucker-type suspension structure in accordance with the present invention may be positioned on the wall stably and rigidly.

A further objective of the present invention is to provide a sucker-type suspension structure, wherein the resting face of the suspension hook is rested on the wall, thereby increasing the structural strength of the suspension hook, so that the suspension hook of the sucker-type suspension structure in accordance with the present invention may be used to support a heavier article.

In accordance with the present invention, there is provided a sucker-type suspension structure, comprising a sucker, a sucker cover, and a suspension hook, wherein:

the sucker has an outer wall having a center provided with a pull plate, the pull plate has a distal end formed with a rod passage hole for passage of a pivot rod;

the sucker cover is mounted on the outer wall of the sucker, and has a center formed with a rectangular plate passage hole for passage of the pull plate of the sucker; and the suspension hook has a top formed with a U-shaped plate receiving space for receiving the pull plate of the sucker, the U-shaped plate receiving space of the suspension hook has two side walls each having a first section formed with a rod passage hole for passage of the pivot rod, and a second section formed with a cover press lug rested on an outer wall of the sucker cover.

Preferably, the pull plate has a mediate portion formed with a pin passage hole for passage of a protective locking pin, and each of the two side walls of the U-shaped plate receiving space of the suspension hook has a mediate section formed with a pin passage hole for passage of the protective locking pin.

Preferably, the sucker is integrally made of soft plastic material.

Preferably, the pull plate is integrally made of rigid plastic material.

Preferably, the sucker cover is integrally made of rigid plastic material.

Preferably, the suspension hook is substantially 5-shaped.

Preferably, the suspension hook has a lower portion provided with a resting face.

Preferably, the outer wall of the sucker cover is provided with an extension plate protruded outward and formed with a pin passage hole for passage of a protective locking pin, the suspension hook has a mediate portion formed with a plate receiving recess for receiving the extension plate of the sucker cover, and the plate receiving recess of the suspension hook has two side walls each formed with a pin passage hole for passage of the protective locking pin.

Further benefits and advantages of the present invention will become apparent after a careful reading of the detailed description with appropriate reference to the accompanying drawings.

DETAILED DESCRIPTION OF THE INVENTION

Figure 1:
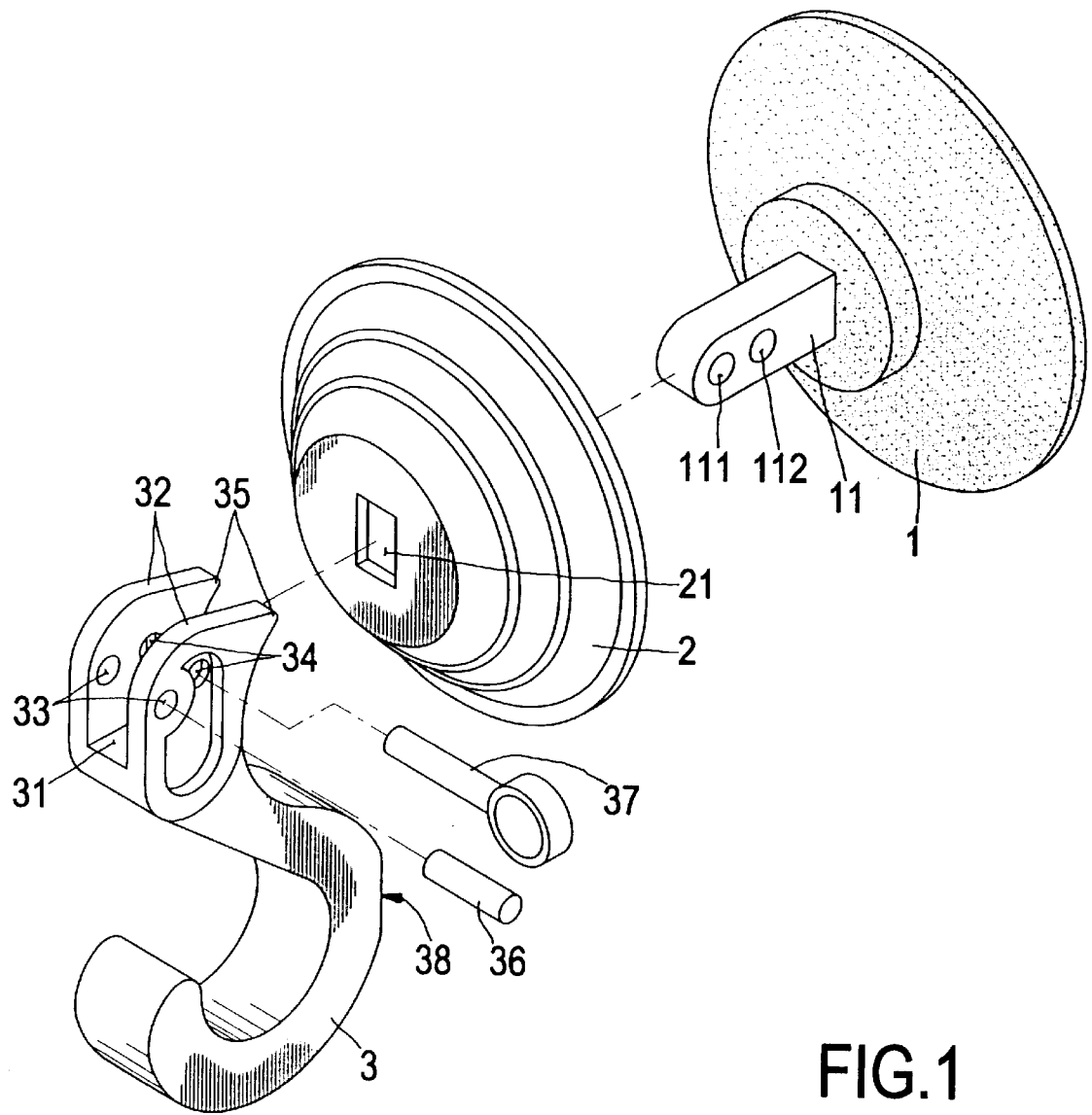
FIG. 1 is an exploded perspective view of a sucker-type suspension structure in accordance with a first embodiment of the present invention.
Figure 2:
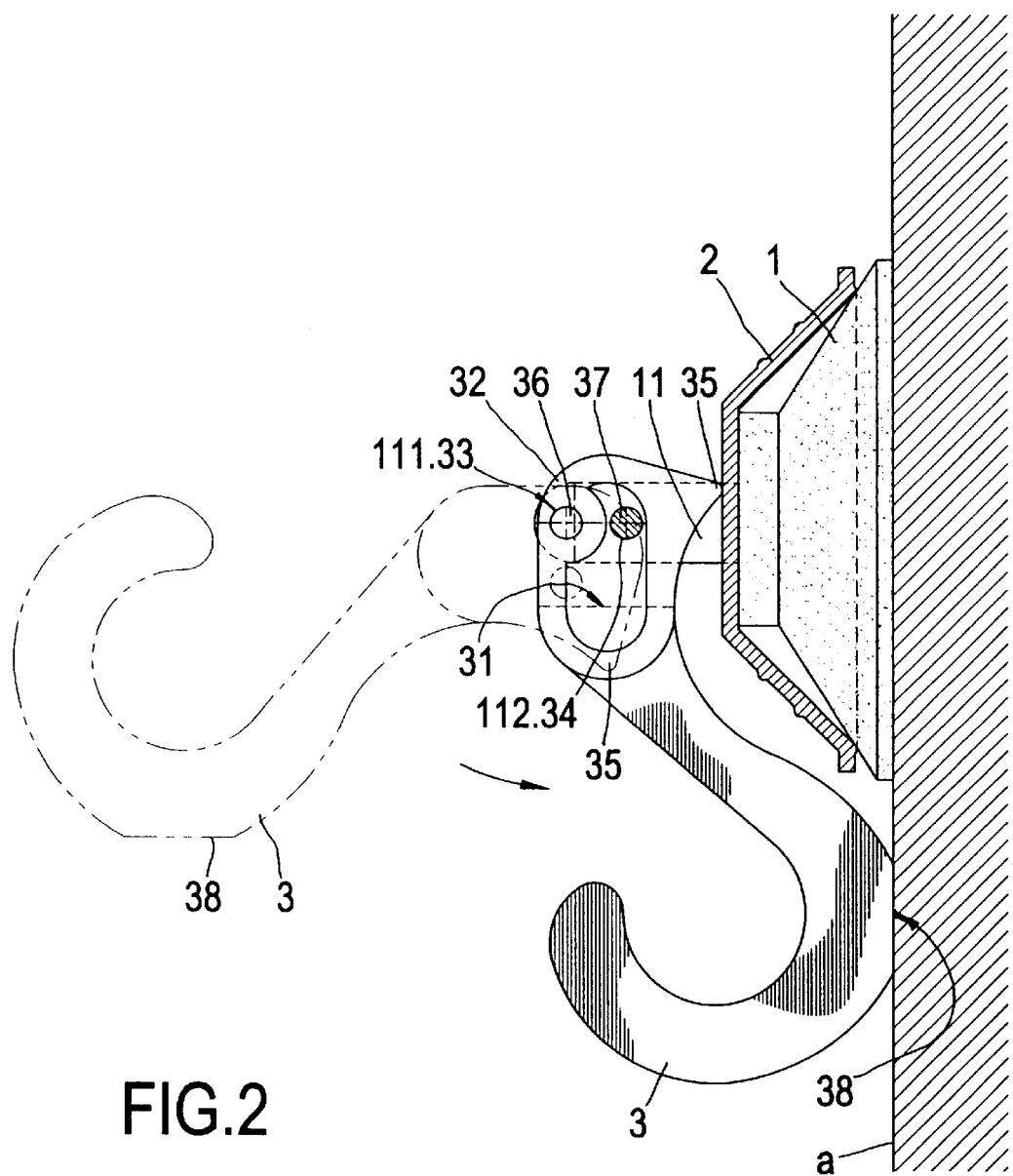
FIG. 2 is a side plan cross-sectional assembly operational view of the sucker-type suspension structure as shown in FIG. 1.
Figure 3:
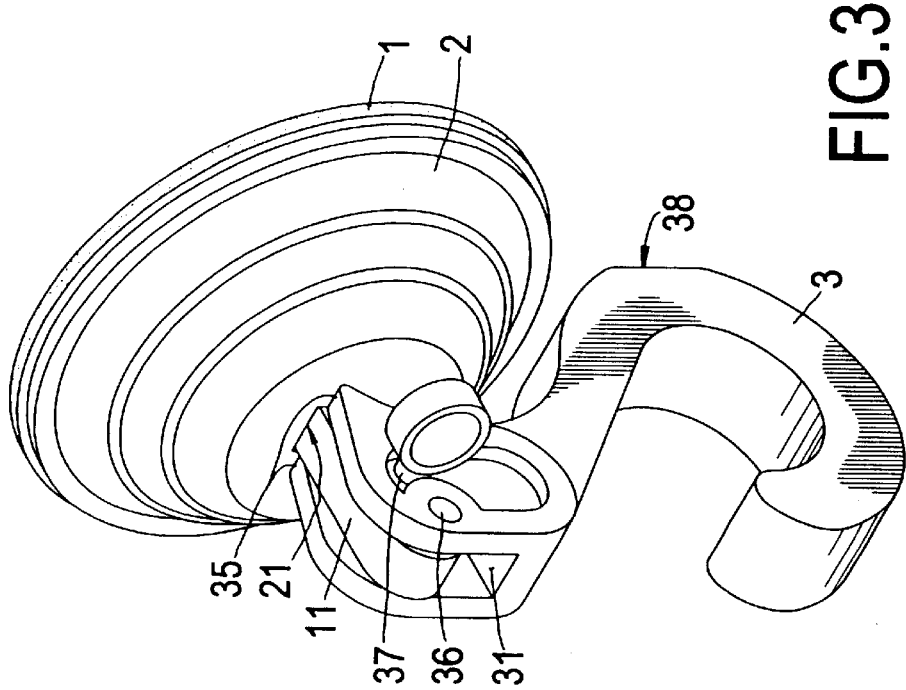
FIG. 3 is a perspective assembly view of the sucker-type suspension structure as shown in FIG. 1.

Referring to the drawings and initially to FIGS. 1–3, a sucker-type suspension structure in accordance with a first embodiment of the present invention comprises a sucker 1, a sucker cover 2, and a suspension hook 3.

The sucker 1 is integrally made of soft plastic material, and has an outer wall having a center provided with a pull plate 11 integrally made of rigid plastic material. The pull plate 11 has a distal end formed with a rod passage hole 111 for passage of a pivot rod 36, and a mediate portion formed with a pin passage hole 112 for passage of a protective locking pin 37.

The sucker cover 2 is mounted on the outer wall of the sucker 1, and is integrally made of rigid plastic material. The sucker cover 2 has a center formed with a rectangular plate passage hole 21 for passage of the pull plate 11 of the sucker 1.

The suspension hook 3 is substantially 5-shaped, and has a top formed with a U-shaped plate receiving space 31 for receiving the pull plate 11 of the sucker 1. The U-shaped plate receiving space 31 of the suspension hook 3 has two side walls 32 each having a first section formed with a rod passage hole 33 for passage of the pivot rod 36, a mediate section formed with a pin passage hole 34 for passage of the protective locking pin 37, and a second section formed with a cover press lug 35. The suspension hook 3 has a lower portion provided with a resting face 38.

In assembly, referring to FIGS. 1 and 2, the sucker cover 2 is mounted on the outer wall of the sucker 1, and the pull plate 11 of the sucker 1 passes through and protrudes outward from the plate passage hole 21 of the sucker cover 2. Then, the suspension hook 3 is mounted on the pull plate 11 of the sucker 1, with the pull plate 11 of the sucker 1 being received in the U-shaped plate receiving space 31 of the suspension hook 3. Finally, the pivot rod 36 is in turn extended through the rod passage holes 33 of the suspension hook 3 and the rod passage hole 111 of the sucker 1, thereby pivoting and positioning the sucker 1, the sucker cover 2 and the suspension hook 3.

In use, referring to FIGS. 2 and 3, the inner face of the sucker 1 is rested on the wall "a". Then, the suspension hook 3 may be pivoted about the pivot rod 36 toward the wall "a", until the cover press lugs 35 of the suspension hook 3 are rested on the back face of the sucker cover 2, and the resting face 38 of the suspension hook 3 is rested on the wall "a", so that the sucker-type suspension structure in accordance with a first embodiment of the present invention may be positioned on the wall "a" stably and rigidly.

Finally, the protective locking pin 37 is in turn extended through the pin passage holes 34 of the suspension hook 3 and the pin passage hole 112 of the pull plate 11 of the sucker 1, so that the suspension hook 3 may be secured on the pull plate 11 of the sucker 1, thereby preventing the suspension hook 3 from being pivoted relative to the pull plate 11 of the sucker 1 due to an external force.

Figure 6:
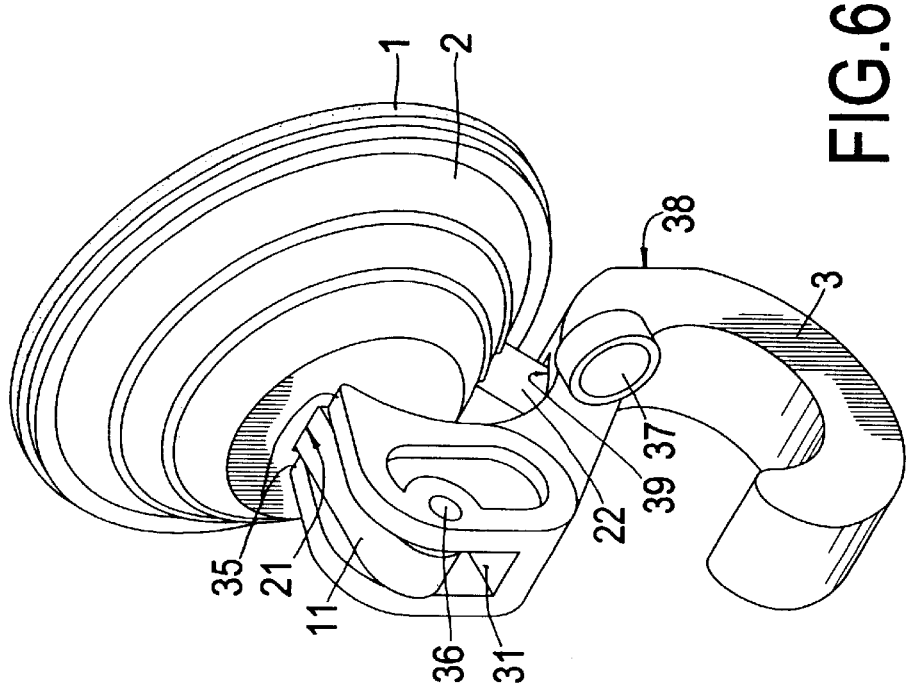
FIG. 6 is a perspective assembly view of the sucker-type suspension structure as shown in FIG. 4.
Figure 4:
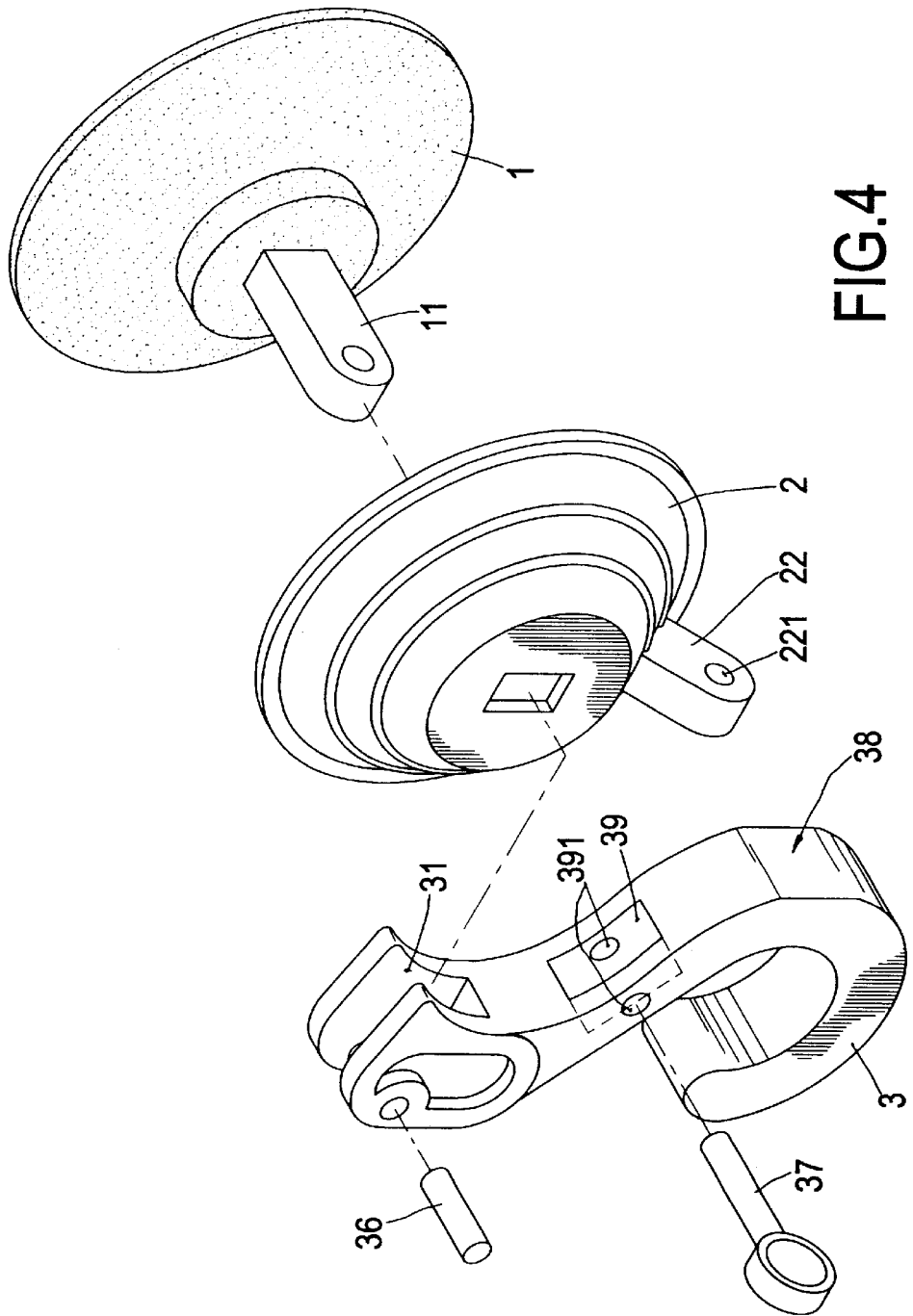
FIG. 4 is an exploded perspective view of a sucker-type suspension structure in accordance with a second embodiment of the present invention.
Figure 5:
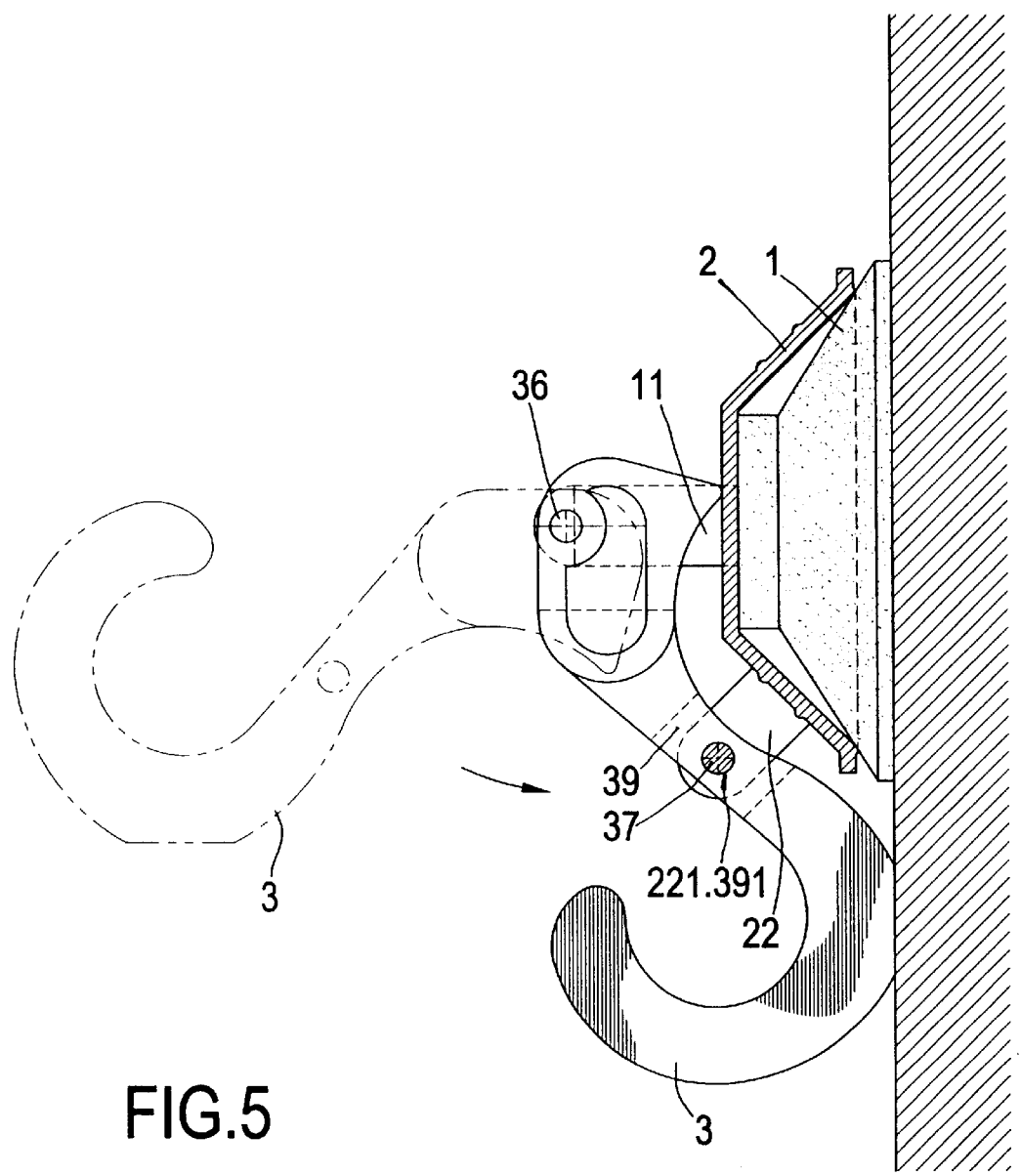
FIG. 5 is a side plan cross-sectional assembly operational view of the sucker-type suspension structure as shown in FIG. 4.

Referring to FIGS. 4–6, a sucker-type suspension structure in accordance with a second embodiment of the present invention is shown.

The outer wall of the sucker cover 2 is provided with an extension plate 22 protruded outward and formed with a pin passage hole 221 for passage of the protective locking pin 37. The suspension hook 3 has a mediate portion formed with a plate receiving recess 39 for receiving the extension plate 22 of the sucker cover 2. The plate receiving recess 39 of the suspension hook 3 has two side walls each formed with a pin passage hole 391 for passage of the protective locking pin 37.

Thus, the protective locking pin 37 is in turn extended through the pin passage holes 391 of the suspension hook 3 and the pin passage hole 221 of the extension plate 22 of the sucker cover 2, so that the suspension hook 3 may be secured on the extension plate 22 of the sucker cover 2, thereby preventing the suspension hook 3 from being pivoted relative to the pull plate 11 of the sucker 1 due to an external force.

Accordingly, the sucker-type suspension structure in accordance with the present invention has the following advantages.

1. The protective locking pin 37 is in turn extended through the pin passage holes 34 of the suspension hook 3 and the pin passage hole 112 of the pull plate 11 of the sucker 1, so that the suspension hook 3 may be secured on the pull plate 11 of the sucker 1, thereby preventing the suspension hook 3 from being detached and pivoted relative to the pull plate 11 of the sucker 1 due to an external force.

2. The cover press lugs 35 of the suspension hook 3 are rested on the back face of the sucker cover 2, and the resting face 38 of the suspension hook 3 is rested on the wall "a", so that the sucker-type suspension structure in accordance with the present invention may be positioned on the wall "a" stably and rigidly.

3. The resting face 38 of the suspension hook 3 is rested on the wall "a", thereby increasing the structural strength of the suspension hook 3, so that the suspension hook 3 of the sucker-type suspension structure in accordance with the present invention may be used to support a heavier article.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A sucker-type suspension structure, comprising a sucker, a sucker cover, and a suspension hook, wherein:
   the sucker has an outer wall having a center provided with a pull plate, the pull plate has a distal end formed with a rod passage hole for passage of a pivot rod;
   the sucker cover is mounted on the outer wall of the sucker, and has a center formed with a rectangular plate passage hole for passage of the pull plate of the sucker;
   the suspension hook has a top formed with a U-shaped plate receiving space for receiving the pull plate of the sucker, the U-shaped plate receiving space of the suspension hook has two side walls each having a first section formed with a rod passage hole for passage of the pivot rod, and a second section formed with a cover press lug rested on an outer wall of the sucker cover; and
   the pull plate of the sucker has a mediate portion formed with a pin passage hole for passage of a protective locking pin, and each of the two side walls of the U-shaped plate receiving space of the suspension hook has a mediate section formed with a pin passage hole for passage of the protective locking pin.

2. The sucker-type suspension structure in accordance with claim 1, wherein the sucker is integrally made of soft plastic material.

3. The sucker-type suspension structure in accordance with claim 1, wherein the pull plate is integrally made of rigid plastic material.

4. The sucker-type suspension structure in accordance with claim 1, wherein the sucker cover is integrally made of rigid plastic material.

5. The sucker-type suspension structure in accordance with claim 1, wherein the suspension hook is substantially 5-shaped.

6. The sucker-type suspension structure in accordance with claim 1, wherein the suspension hook has a lower portion provided with a resting face.

7. A sucker-type suspension structure, comprising a sucker, a sucker cover, and a suspension hook, wherein:
   the sucker has an outer wall having a center provided with a pull plate, the pull plate has a distal end formed with a rod passage hole for passage of a pivot rod;

the sucker cover is mounted on the outer wall of the sucker, and has a center formed with a rectangular plate passage hole for passage of the pull plate of the sucker;

the suspension hook has a top formed with a U-shaped plate receiving space for receiving the pull plate of the sucker, the U-shaped plate receiving space of the suspension hook has two side walls each having a first section formed with a rod passage hole for passage of the pivot rod, and a second section formed with a cover press lug rested on an outer wall of the sucker cover; and the outer wall of the sucker cover is provided with an extension plate protruded outward and formed with a pin passage hole for passage of a protective locking pin, the suspension hook has a mediate portion formed with a plate receiving recess for receiving the extension plate of the sucker cover, and the plate receiving recess of the suspension hook has two side walls each formed with a pin passage hole for passage of the protective locking pin.

* * * * *